Jan. 23, 1951 L. A. BRIGGS 2,538,759
TRUCK TIRE MOUNTING AND DEMOUNTING
ATTACHMENT FOR HYDRAULIC LIFTS
Filed Sept. 23, 1946 4 Sheets-Sheet 1

INVENTOR.
LESLIE A. BRIGGS
BY *Victor J. Evans & Co.*
ATTORNEYS

Jan. 23, 1951
L. A. BRIGGS
2,538,759
TRUCK TIRE MOUNTING AND DEMOUNTING
ATTACHMENT FOR HYDRAULIC LIFTS
Filed Sept. 23, 1946
4 Sheets-Sheet 2
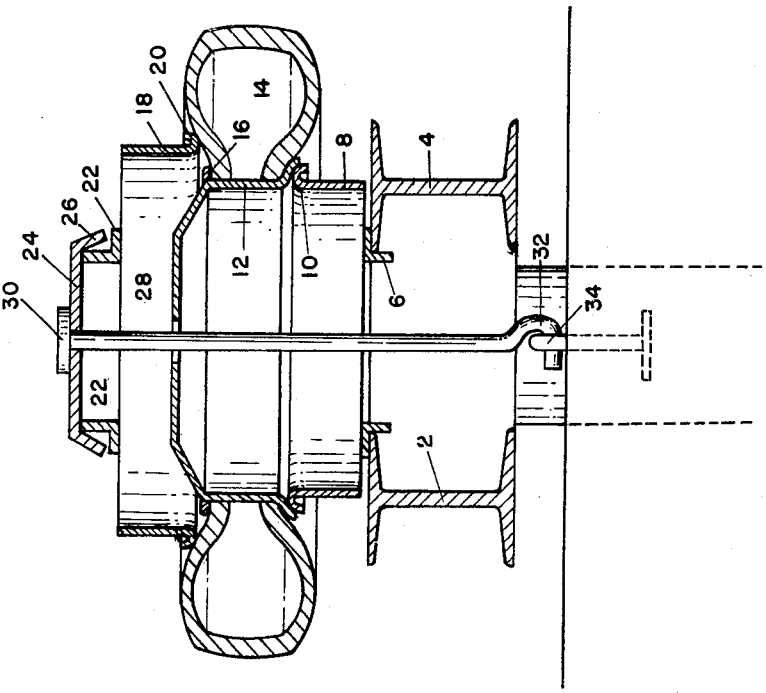
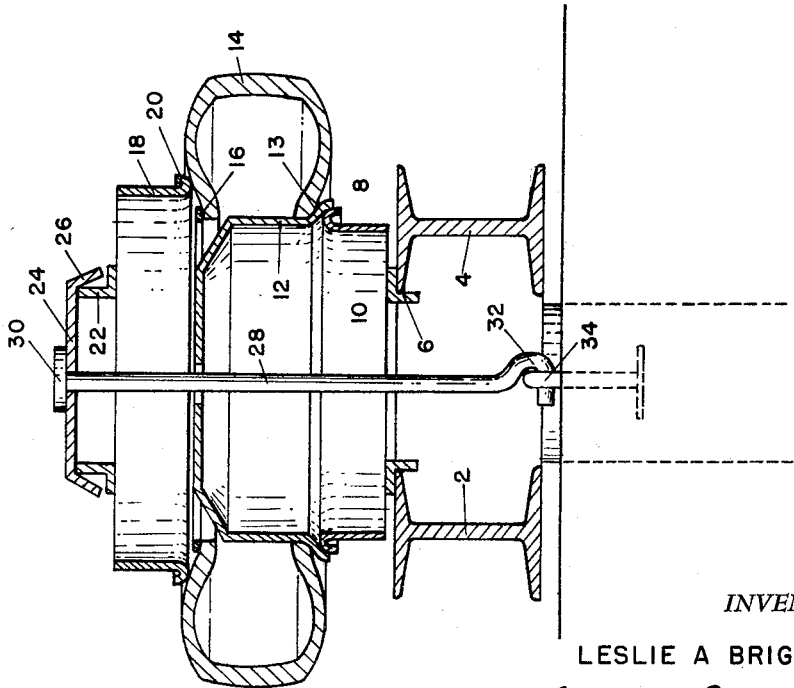
INVENTOR.
LESLIE A BRIGGS
BY *Victor J. Evans & Co.*
ATTORNEYS

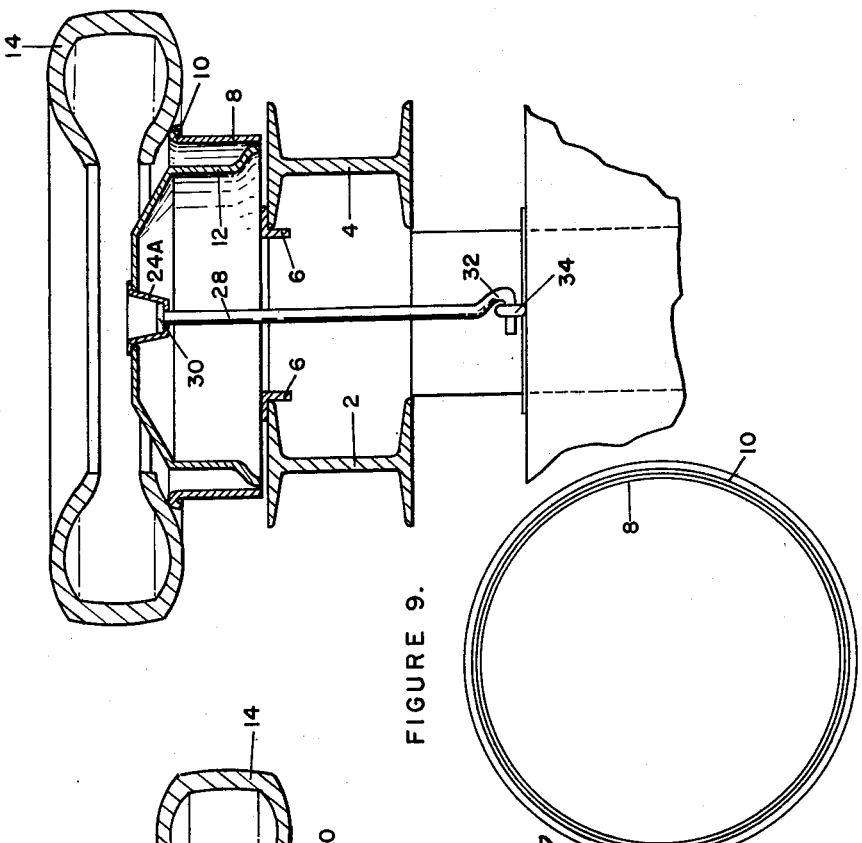
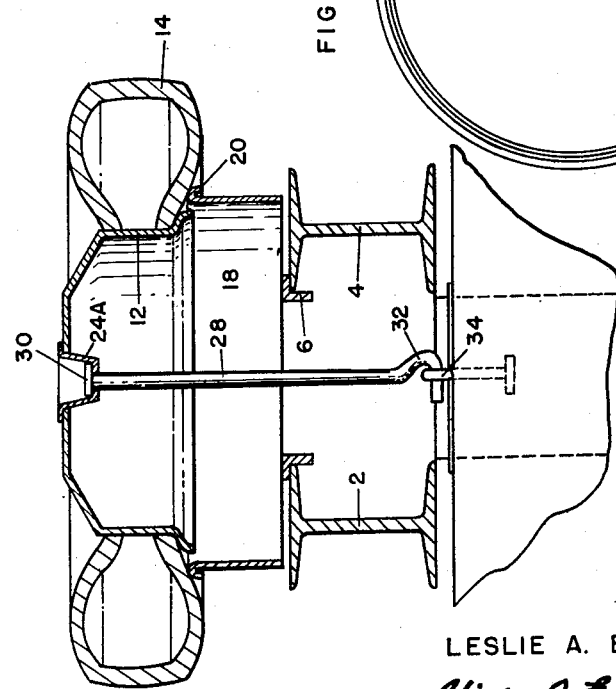

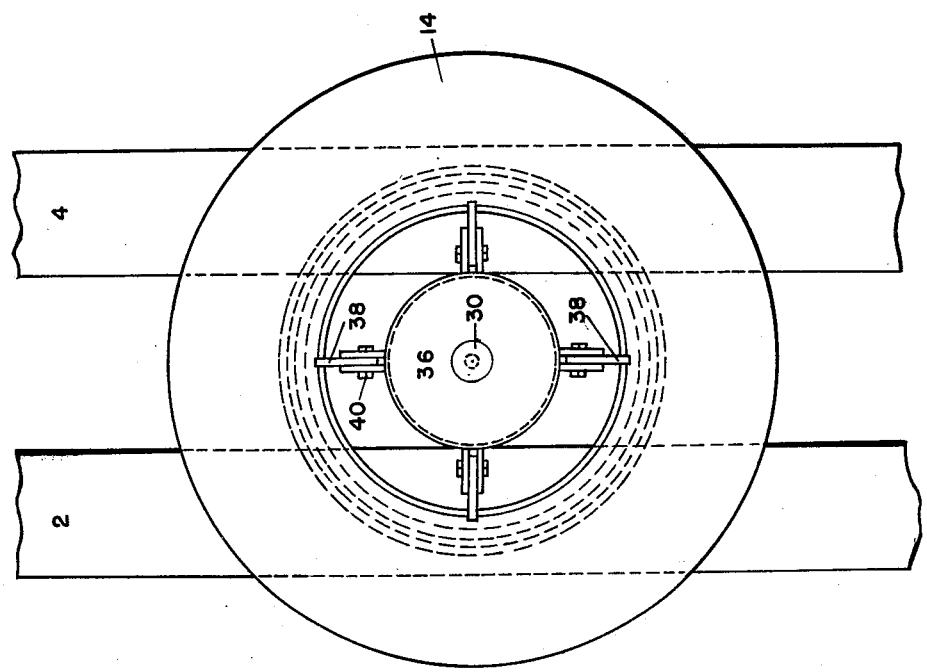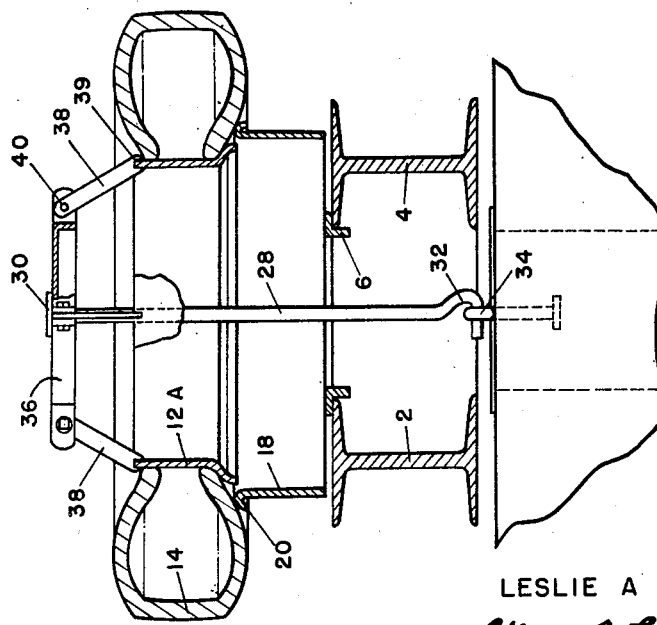

Patented Jan. 23, 1951

2,538,759

UNITED STATES PATENT OFFICE 2,538,759

TRUCK TIRE MOUNTING AND DEMOUNTING ATTACHMENT FOR HYDRAULIC LIFTS

Leslie A. Briggs, Appleton, Minn.

Application September 23, 1946, Serial No. 698,786

4 Claims. (Cl. 157—1.2)

My present invention relates to an improved truck tire mounting and demounting attachment for hydraulic lifts and particularly adapted for use in removing rusted and frozen tires of large size such as are used in heavy trucks, as well as mounting new or repaired tires wherein the physical strength normally required is eliminated.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 2 is a vertical sectional view of the apparatus ready to mount a tire on its rim.

Fig. 3 is a similar view with the lift raised and the tire mounted.

Fig. 5 is a vertical sectional view of the demounting arrangement.

Fig. 6 is a similar view with the tire removed.

Fig. 7 is a vertical sectional view of the modified apparatus to operate with demountable rims.

Fig. 8 is a top plan view thereof.

Fig. 9 is a top plan view of a pressure ring.

Figure 4:
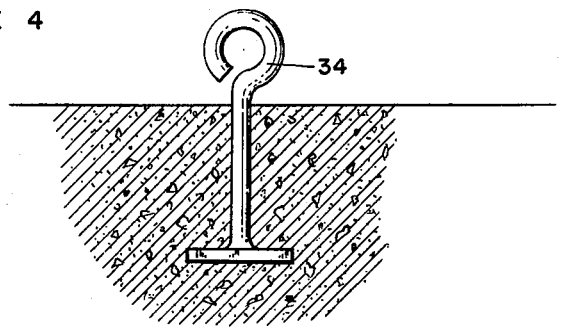
Fig. 4 is a plan view of the eye bolt imbedded in concrete below the lift.
Figure 1:
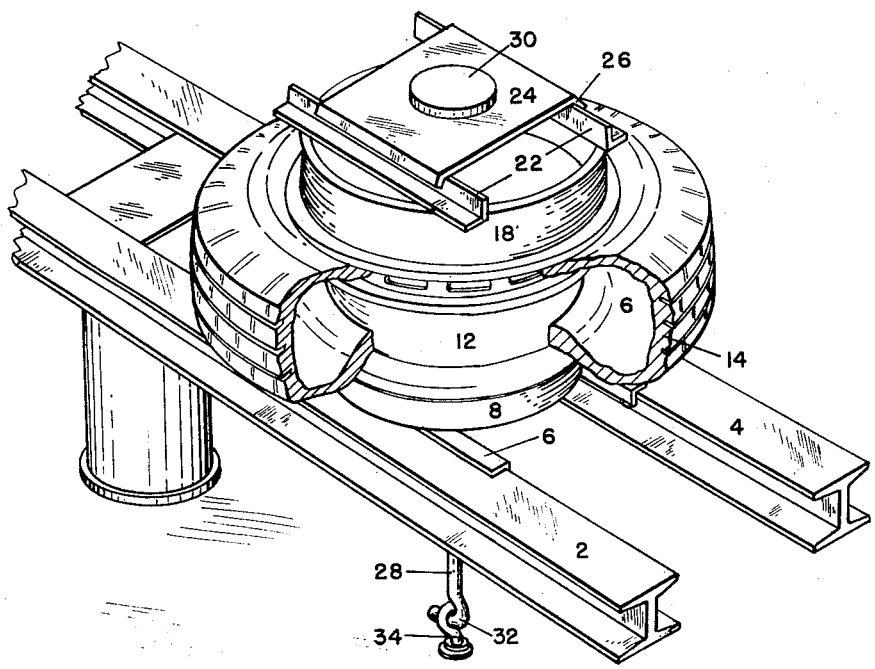
Fig. 1 is a perspective view of the apparatus of my invention shown in position for use on a conventional hydraulic lift.

In carrying out my invention I utilize the conventional hydraulic lift used in garages and filling stations for elevating vehicles for service and having spaced beams 2 and 4. I prefer to use a pair of angle iron flanges 6 on the inner edges of the beams to support the ring 8 having an upper bead 10. In mounting a tire the rim 12 is placed on the ring 8 with the usual flange 13 against the bead 10 and the tire 14 is positioned on the rim 12 with the locking ring 16 in place.

A second ring 18 having a lower bead 20 resting on the tire wall near the tire bead has a pair of angle irons 22 across the open center of the ring to receive a cap 24 formed with beveled edges 26.

A bolt 28 is positioned vertically through the beams, rings, tire, rim, flanges and cap and is secured to the cap by the disk forming a head 30. A lower hook 32 is inserted through the eye bolt or socket 34 embedded in the concrete base of the lift. Thus when the lift is elevated the ring 8 presses against the rim 12 while the ring 18 is pressed against the tire forcing the tire onto the rim, as in Figs. 2 and 3.

To dismount a tire from a wheel the tire 14 is placed on the ring 18 in inverted position and a depressed cap 24a in the axle opening of the wheel secures the bolt 28 as stated above. When the lift is raised the wheel is held stationary while the tire is forced up and off of the wheel as in Figs. 5 and 6.

For demountable rims as seen in Figs. 7 and 8 I provide a spider frame 36 having arms 38 notched at 39 and pivotally secured to the frame by pins 40. These arms engage the edge of the rim 12a while the ring 18 engages the tire to force it off when the lift is raised.

Obviously rings of various sizes will be available to accommodate tires and wheels of different sizes and it will be apparent that the ring 18 is larger than the ring 8 so that the larger ring will encircle the wheel or rim engaging the tire wall.

Having thus fully described my invention what is claimed is:

1. A demountable tire attachment for a hydraulic lift having a foundation with spaced parallel beams positioned above the foundation and adapted to be elevated therefrom by hydraulic means, a ring having a rolled bead around the upper edge positioned on said beams, a socket secured in the foundation and positioned midway between the beams, a vertically disposed rod having a head on the upper end, a hook on the lower end engaged in the socket in the foundation, and means anchoring the head of the rod to the rim of a wheel positioned on said ring.

2. A demountable tire attachment for a hydraulic lift having a foundation with spaced parallel beams positioned above the foundation and adapted to be elevated therefrom by hydraulic means, a ring having a rolled bead around the upper edge positioned on said beams, a socket secured in the foundation and positioned midway between the beams, a vertically disposed rod having a head on the upper end and a hook on the lower end engaged in the socket in the foundation, and a cap mounted on the head of the rod for anchoring the rod to a wheel positioned on the said ring.

3. A demountable tire attachment for a hydraulic lift having a foundation with spaced parallel beams positioned above the foundation and adapted to be elevated therefrom by hydraulic means, a ring having a rolled bead around the upper edge positioned on said beams, a socket secured in the foundation and positioned midway between the beams, a vertically disposed rod having a head on the upper end and a hook on the lower end engaged in the socket in the foundation, and anchoring means having pivotally mounted arms mounted on the rod under the head thereof with the outer ends of the arms adapted to engage the rim of a wheel positioned on the said ring.

4. A demountable tire attachment for a hydraulic lift having a foundation with spaced parallel beams positioned above the foundation and adapted to be elevated therefrom by hydraulic means, a ring having a rolled bead around the upper edge positioned on said beams, a socket secured in the foundation and positioned midway between the beams, a vertically disposed rod having a head on the upper end, a hook on the lower end engaged in the socket in the foundation, and means transmitting pressure resulting from upward movement of the said parallel beams to a tire on a rim with the parts anchored by the said vertically disposed rod and with the resultant force applied to the under surface of the head of said rod.

LESLIE A. BRIGGS.

REFERENCES CITED

The following references are of record in the file of this patent:

UNITED STATES PATENTS

| Number | Name | Date |
| --- | --- | --- |
| 1,352,722 | Caldwell | Sept. 14, 1920 |
| 1,548,136 | Grange | Aug. 4, 1925 |
| 2,228,086 | Rodgers | Jan. 7, 1941 |